US008204510B2

(12) United States Patent
Mills

(10) Patent No.: US 8,204,510 B2
(45) Date of Patent: Jun. 19, 2012

(54) DETECTION AND SELECTION OF A REFERENCE SIGNAL FOR NETWORK-BASED WIRELESS LOCATION

(75) Inventor: Donald C Mills, West Chester, PA (US)

(73) Assignee: TruePosition, Inc., Berwyn, PA (US)

( * ) Notice: Subject to any disclaimer, the term of this patent is extended or adjusted under 35 U.S.C. 154(b) by 92 days.

(21) Appl. No.: 12/900,858

(22) Filed: Oct. 8, 2010

(65) Prior Publication Data

US 2012/0088522 A1   Apr. 12, 2012

(51) Int. Cl.
*H04W 24/00* (2009.01)
(52) U.S. Cl. ..................... 455/456.1; 342/378
(58) Field of Classification Search .................. 455/414, 455/404, 456, 67, 63, 464, 411, 412; 370/328–338, 370/345, 478; 375/130–132; 342/378–387, 342/457
See application file for complete search history.

(56) References Cited

U.S. PATENT DOCUMENTS

| | | | |
|---|---|---|---|
| 5,327,144 A | 7/1994 | Stilp et al. | |
| 6,047,192 A | 4/2000 | Maloney et al. | |
| 6,118,805 A * | 9/2000 | Bergstrom et al. | 375/132 |
| 6,281,834 B1 * | 8/2001 | Stilp | 342/174 |
| 6,661,379 B2 | 12/2003 | Stilp et al. | |
| 6,765,531 B2 | 7/2004 | Anderson | |
| 2006/0116081 A1 * | 6/2006 | Shah | 455/67.11 |
| 2009/0149202 A1 * | 6/2009 | Hill et al. | 455/456.6 |

OTHER PUBLICATIONS

International Patent Application No. PCT/US2011/55448: International Search Report and Written Opinion dated Jan. 20, 2012, 12 pages.

* cited by examiner

*Primary Examiner* — Kent Chang
*Assistant Examiner* — Kashif Siddiqui
(74) *Attorney, Agent, or Firm* — Woodcock Washburn LLP

(57) ABSTRACT

A serving mobile location center (SMLC) receives a position request concerning a mobile-of-interest (MOI) operating in a discontinuous transmission (DTX) mode, and in response a wireless location system (WLS) is tasked to locate the MOI. A plurality of location measurement units (LMUs) are instructed to receive and digitize radio frequency (RF) energy. At the LMUs, a signal of interest is received and cross-correlated with a known training sequence to produce a received detection metric. The detection metric is weighted to favor the MOI even in the presence of interference from other mobile devices. The SMLC selects the LMU with the best weighted detection metric as a reference site and selects two or more LMUs with lesser weighted detection metrics above a threshold as co-operating sites. The received signal of interest is demodulated and demodulated data are distributed to the co-operating sites. The co-operating sites produce a reference waveform and cross-correlate the reference waveform with stored data to produce a TDOA measurement at each co-operating site, and the TDOA measurements are used to compute MOI position information.

23 Claims, 5 Drawing Sheets

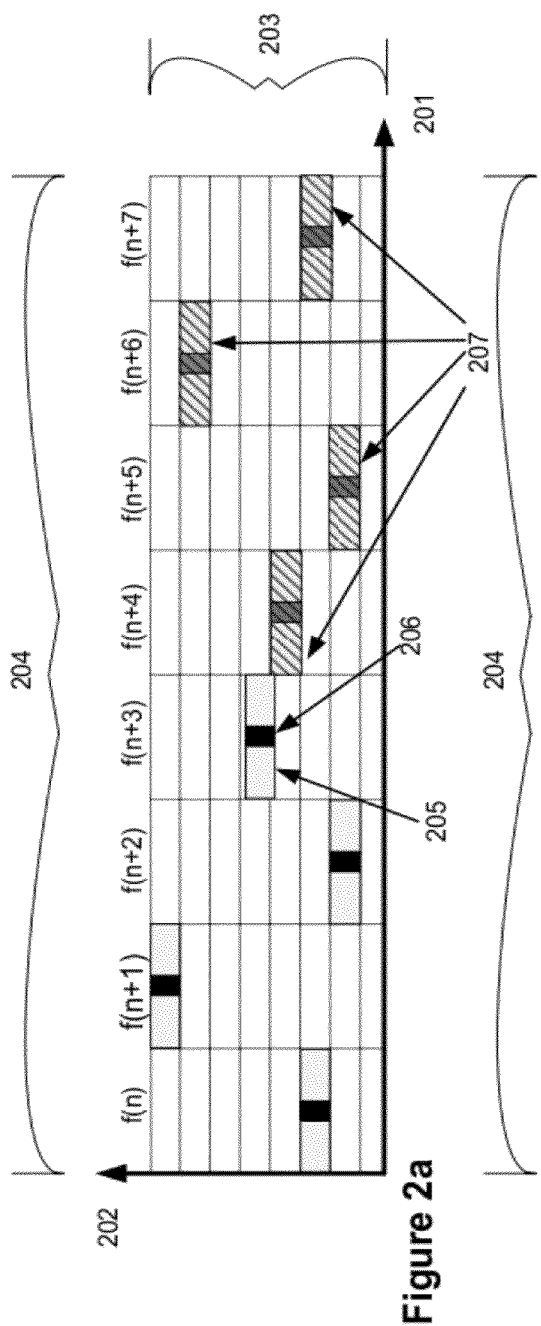
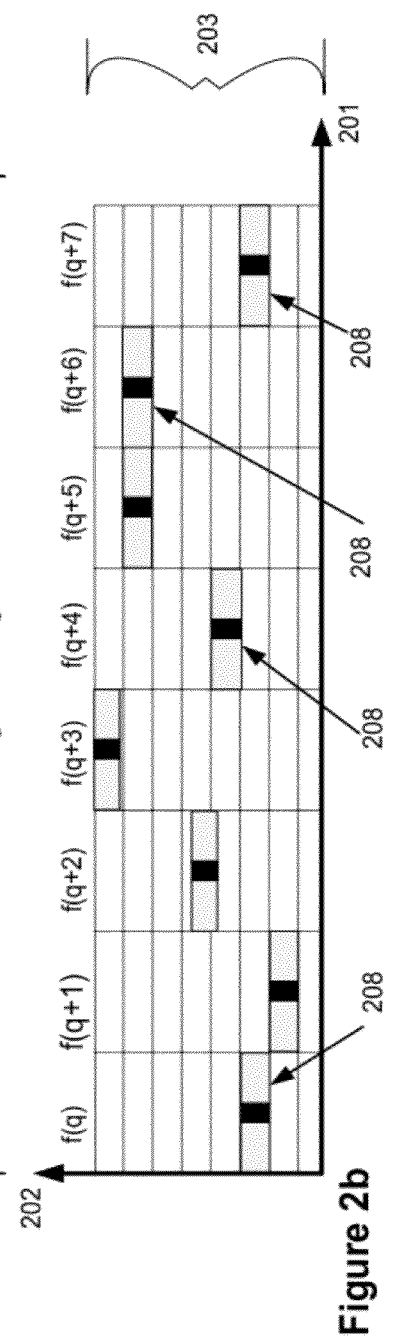
Figure 2a
Figure 2b

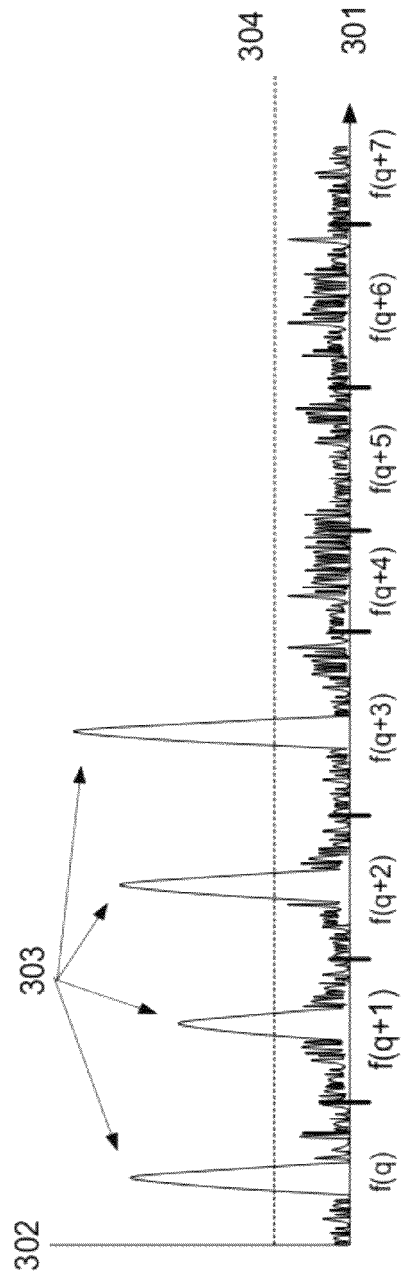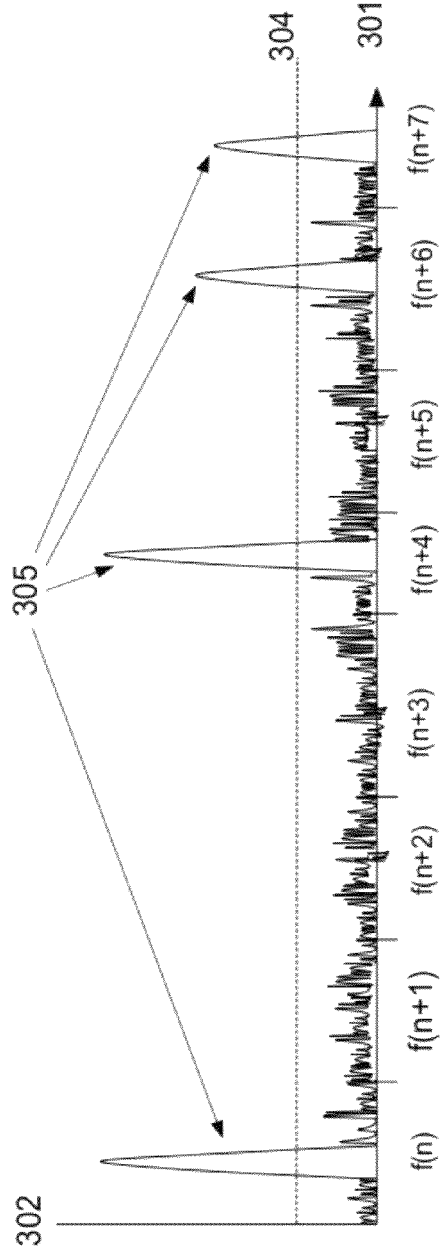

DETECTION AND SELECTION OF A REFERENCE SIGNAL FOR NETWORK-BASED WIRELESS LOCATION

TECHNICAL FIELD

The present invention relates generally to methods and apparatus for locating wireless devices, also called mobile stations (MS), such as those used in analog or digital cellular systems, personal communications systems (PCS), enhanced specialized mobile radios (ESMRs), and other types of wireless communications systems. More particularly, but not exclusively, the present invention relates to the system and method for detecting and selecting the correct reference signal in the presence of interfering co-channel signals for correlation processing in a wireless location system (WLS).

BACKGROUND

First commercially deployed in 1998 by TruePosition in Houston, Tex., overlay network-based wireless location systems have been widely deployed in support of location-based services including emergency services location. Network-based systems rely on the reception of the wireless device originated uplink mobile transmission, which is used in a time-of-arrival (TOA), time-difference-of-arrival (TDOA), power-of-arrival (POA), power-difference-of-arrival (PDOA) or angle-of-arrival (AoA) location calculation. Network-based location calculations can be combined with mobile-based measurements, collateral information, or with other network-based location calculations to form hybrid locations.

As realized and noted in extensive prior art, the ability to routinely, reliably, and rapidly locate cellular wireless communications devices has the potential to provide significant public benefit in public safety and convenience and in commercial productivity.

A cellular network is designed to exploit frequency reuse. That is, careful planning and surveying of radio transmission frequencies to control adjacent and co-channel interference is performed in a cellular network on a more-or-less continuous basis. In addition to frequency planning, the various wireless communications protocols were also designed to both minimize and tolerate adjacent and co-channel interference. Techniques for minimizing such interference include SAT tones in AMPS, color-codes in IS-136, frequency hopping patterns in GSM, code separation in CDMA (IS-95 & IS-2000) and UMTS (also known as W-CDMA), and both frequency hopping patterns and zero-autocorrelation Zadoff-Chu sequences in LTE.

Since a network-based WLS relies on receiving the signal from the mobile-of-interest at geographically distributed land-based receivers, the likelihood of co-channel interference is increased since the geographic reuse pattern of the underlying cellular network cannot be relied on to isolate transmissions.

As detailed in the U.S. Pat. No. 5,327,144, "Cellular telephone location system," and U.S. Pat. No. 6,047,192, "Robust, efficient, localization system", correlation processing of signals received by geographically separated wireless receivers can be used with extremely weak signals such as those found in frequency reuse cellular systems to generate time-difference-of-arrival (TDOA), angle-of-arrival (AoA), and hybrid TDOA/AoA location and velocity estimates.

The inventive techniques and concepts described herein apply to time and frequency division multiplexed (TDMA/FDMA) radio communications systems including the widely used IS-136 (TDMA), GSM, and OFDM wireless systems, as well as the OFDM-based WIMAN (IEEE-802.16), WiMAX (IEEE-802.20), and Long Term Evolution (LTE) Evolved Universal Terrestrial Radio Access Network (EuTRAN). The Global System for Mobile Communications (GSM) model discussed above is an exemplary but not exclusive environment in which the present invention may be used.

The following U.S. patents describe systems and methods of interference cancellation and antennae selection in association with a wireless location system: U.S. Pat. No. 6,765,531 B2, Jul. 20, 2004, "System and Method for Interference Cancellation in a Location Calculation, for Use in a Wireless Location System"; and U.S. Pat. No. 6,661,379, Dec. 9, 2003, "Antenna Selection Method and System for a Wireless Location System". These provide further background information relating to the presently described subject matter.

SUMMARY

In a wireless communications system, a network-based wireless location system using geographically distributed land-based receivers may suffer interference on the signal received from the mobile-of-interest. Using a correlation matching between the received signal and the expected signal allows the wireless location system to determine a detected frame sequence at each receiver. In some modes, such as Discontinuous Transmission Mode (DTX) in a GSM network, the mobile does not transmit in all of its assigned frames. The same is true in the LTE environment in which case the frequency/time assignment combinations may go unused while the mobile is in DTX. Though the exact frames that the mobile selects to transmit when in DTX mode are not known by the network, the mobile transmissions tend to occur in "bursts" and the pattern of the frames detected can be analyzed to determine the likelihood that the mobile-of-interest has been identified. By ignoring large frame offsets for otherwise valid detections and biasing the detection metric toward favoring small, repeated frame offsets indicative of bursty transmissions, selection of the mobile-of-interest over the interfering mobile is enhanced and thus the correct reference signal for location estimation can be determined.

BRIEF DESCRIPTION OF THE DRAWINGS

The foregoing summary as well as the following detailed description are better understood when read in conjunction with the appended drawings. For the purpose of illustrating the invention, there is shown in the drawings exemplary constructions of the invention; however, the invention is not limited to the specific methods and instrumentalities disclosed. In the drawings:

FIG. 2a illustrates frequency hopping transmissions of a mobile to be located.

FIG. 2b illustrates frequency hopping transmissions of an interfering mobile.

FIG. 3a depicts a correlation signal representing the correlation of a signal from the mobile-of-interest with an expected signal.

FIG. 3b depicts a correlation signal representing the correlation of a signal from an interfering mobile with the expected signal.

DETAILED DESCRIPTION OF ILLUSTRATIVE EMBODIMENTS

Figure 1:
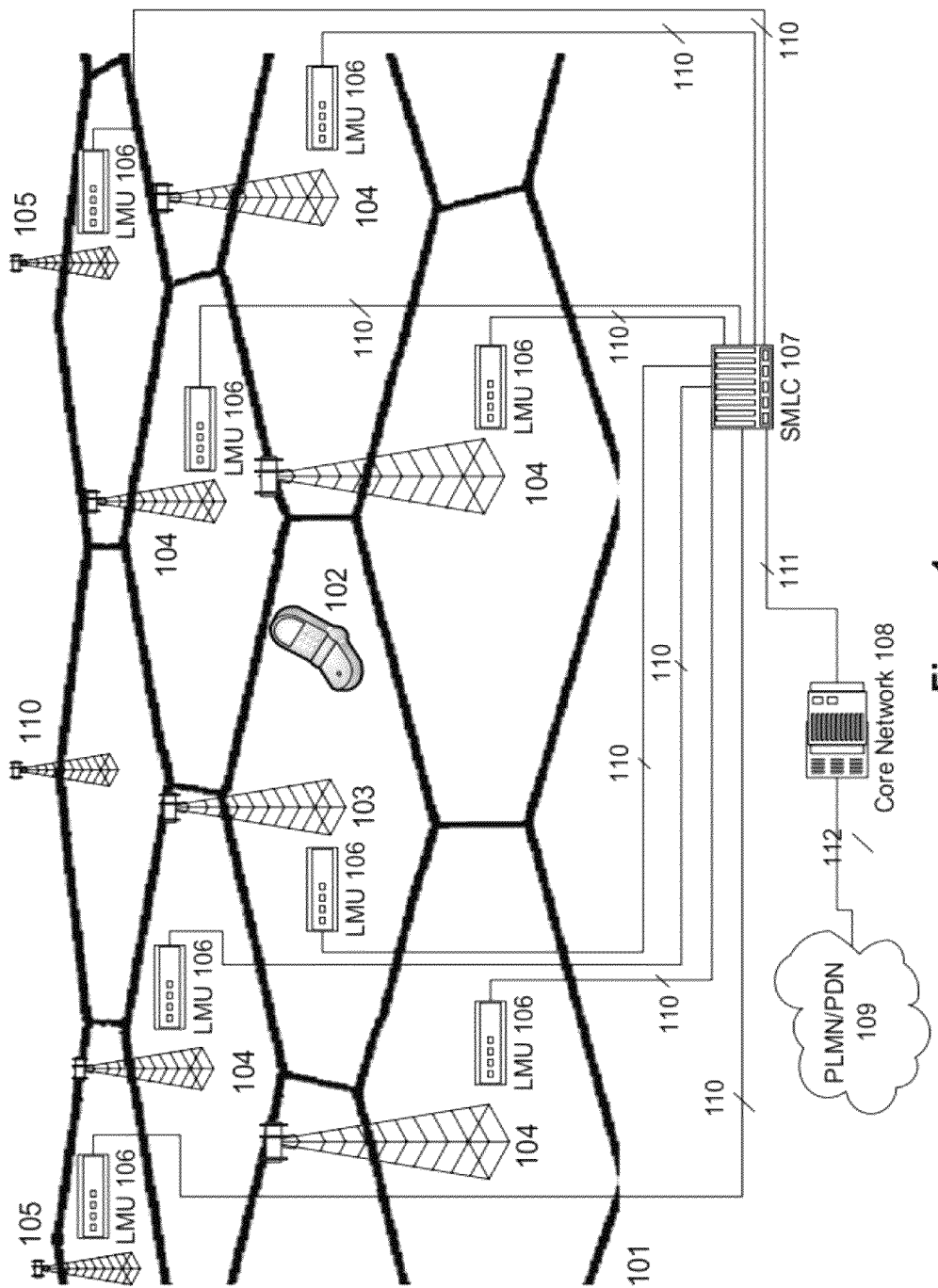
FIG. 1 schematically depicts a wireless location system deployed within a wireless communications network.

We will now describe illustrative embodiments of the present invention. First, we provide a detailed overview of the problem and then a more detailed description of our solutions.

As wireless usage increases and the need for spectral efficiency grow, wireless network operators will adjust frequency reuse patterns and power settings to maximize potential traffic. Examples of frequency reuse patterns can be seen in FIGS. 4a, 4b, 4c, and 4d. One form of power control is discontinuous transmission (DTX) in which the mobile greatly reduces transmission during periods of inactivity. DTX has the dual benefit of reducing interference in neighboring cells while also lowering mobile device power consumption and is thus a highly favored power-control option.

For a network-based wireless location system that uses geographically distributed receivers to collect and timestamp the uplink (mobile-to-base station) radio signals, both tighter frequency reuse and implementation of DTX increase the probability of an interfering mobile being mistaken for the mobile-of-interest. As an example scenario, the mobile-of-interest (the mobile to be located) is active and in DTX, being served by a base station in the cellular wireless network. In the DTX mode, the mobile transmits in a "bursty" mode (usually four consecutive frames in the case of GSM) with long periods of no transmission in between. An interfering mobile is served by a nearby base station in a neighboring or proximate cell. The interfering mobile may be in DTX also, but for this example is not, which raises the probability of interference. The timing of the two base stations is fairly close (this can occur randomly in an unsynchronized TDMA/FDMA system such as the GSM system or the OFDM-based LTE system). The two mobiles are assigned to the same training sequence and to different frequency hopping patterns, but some frequencies are used by both mobiles and the hopping patterns collide randomly, resulting in both mobiles being assigned to the same frequency at the same time. The timing is close enough for preamble/midamble (or even post-amble) detection and thus uplink frames from the interfering mobile can be mistaken for frames from the mobile-of-interest.

The WLS is tasked to locate the mobile-of-interest. Network and radio channel information is made available to the WLS by the wireless communications network (WCN). In GSM, this information includes serving cell, radio frequency, training sequence (midamble in this example, but this could be a pre-amble or post-amble), frequency hopping pattern, and timeslot. Using this information, the WLS tasks the LMUs assigned to the pre-established primary sectors and secondary sectors for the serving cell in an effort to collect the best quality signal to serve as the reference signal for later correlation processing. This signal processing method and resulting gain allows for large numbers of antenna elements to participate in a given location attempt. The large number of antenna elements improve statistical success of the location process providing immunity to local interference at a given cooperating cell site, a lower variance in accuracy, excellent yield (greater than 99% for a single location attempt) and the ability to achieve reliable indoor performance despite the attenuation of building structures.

Since, in the GSM system, the midamble (comprised of the transmitted training sequence) is present in every frame and is known to the WLS, correlation of the WCN-provided training sequence with the received midamble allows for quick detection and classification by quality metric of the reference signal from the mobile-of-interest. Since there are only eight defined GSM training sequences, re-use of the same midamble within a small area is common.

However, if an interfering mobile, using the same midamble and randomly hopping onto the same frequency assigned to the mobile-of-interest in that timeslot, is detected well enough at one or more secondary LMU sectors to provide the highest detection metric, the wrong signal may be selected as the reference signal. Once the interfering mobile is chosen as the reference, its waveform will then be distributed to the co-operating receivers and located by the WLS. Since the interfering mobile provided a strong reference signal, the location result for the interfering mobile (and not the mobile-of-interest) is often precise with high confidence. In reality, since the wrong mobile was located, the inaccuracy can be in the several kilometers range despite the high confidence. When discovered in drive testing, these precise and yet inaccurate locations were deemed "wild locates". We repeat this terminology below.

To minimize the occurrence of wild locates, a method for weighting the detection metric to favor the target mobile-of-interest even in the presence of the interfering mobile has been created. The detection metric approach was favored as it has no impact and requires no changes on the underlying WCN. Changes to the core WLS algorithms, such as constraining the number of secondary sectors, was also rejected since such a change could lower overall WLS accuracy and would require tailoring to meet the varying cell site density and cell site deployment density (number of BTS with co-located LMU) for each market. An important component of the weighting algorithm is based on the numerical distribution of the frame offset list. Frame offset sequences with sequences of small offsets (e.g., representing groups of consecutive frames) interspersed with larger offsets representing DTX silent periods are favored over sequences of more evenly distributed offsets (representing random collisions in the two hopping sequences), even if the interfering sequence has a higher detection metric and/or more frames detected.

No consistent relationship between the signal strength at the detecting LMU and at the interfering LMU was found. Weighting of one receiver's detection metric over another receiver's by the number of detected bursts was found to be a generally good indicator but, due to DTX for the MOI, could still lead to selection of the interfering mobile over the MOI.

Testing showed a superior selection of the MOI when the detection metric weighting is determined by evaluating the number of frames between subsequent detected bursts ("frame offsets"). In a GSM system, a mobile device in DTX mode generally transmits in groups of four consecutive frames, while an interfering phone's hopping pattern will collide randomly.

Since it was desired to focus on groups of consecutive, or near consecutive, frames while disregarding expected long periods of silence, a weighting factor was developed by discarding a portion (e.g., the numerically larger half) of the frame offsets and averaging the remaining offset values. The detection metric from each LMU was then divided by its weighting factor to produce the set of weighted metrics used in selection of the reference.

The detection algorithm was further adjusted to consider the detected number of frames and to correctly handle cases with a very small number of detected frames.

The revised algorithm identified the vast majority of apparent cases of selection of the wrong mobile, with very few instances of selection of the wrong reference in other cases.

In testing, using field-collected data in simulation with the revise algorithm, location improvement varied widely from market to market, and is very heavily skewed toward calls with the largest errors. In the instances addressed by this method, the interfering mobile is far enough away to be served by a cell using the same training sequence and at least some of the same channels in its hopping sequences—usually at least on the order of twice the cell site spacing in the area.

Reference Detection Metric and Weighted Metric

In the selection of the reference signal, the primary LMU and the set of secondary LMUs are requested by the SMLC to demodulate the signal of interest, in this case, the midamble or CZ sequence in the uplink signal on the established channel. Each LMU (the primary and all secondaries) then return a response that includes:

Strongest Receive Antenna (sector)
Signal Strength at Strongest Receive Antenna
Frequency offset from channel
Frames counted
Reference Detection Metric (RDM)

The RDM is calculated by the LMU internally from the calculated signal-to-noise-ratio (SNR) of the midamble based on the number of corrupted bits in the collected training sequences and the number of frames detected.

In one exemplary embodiment, each primary or secondary LMU returns a single RDM for the strongest (best signal/noise) receive sector. In an alternative embodiment, to improve reference selection performance using the described weighting technique, each LMU may return RDM information separately for each receive sector or the weighting algorithm could be applied within the LMU to each sector individually before selection of that LMU's "best" sector.

The SMLC then weights the RDM received from each primary and secondary LMU. An example weighting formula is:

$$RDMweighted = RDM * Wsector * Wsequence * \sqrt{(NumFrames)}$$

where,

NumFrames=the number of frames detected by this LMU during the reference selection stage;
MaxFrames=the number of frames requested (typically 48 for traffic channel locations);
RDM=Detection metric received from this LMU during the reference selection stage;
Wsector=
  2—if the metric is derived from the serving sector;
  1.5—if the metric is derived from a different sector at the serving site;
  1—otherwise;
Wsequence=
  (NumFrames/10)—if NumFrames$\leq$5;
  (1/the Mean of the Frame Offsets that are less than Median of the Frame offsets) [essentially dropping the numerically larger half of the Frame Offsets in the GSM_TDOA_DETECTION message and averaging the remaining values] if 6$\leq$NumFrames<MaxFrames.
  Otherwise 1 if NumFrames=MaxFrames.

The SMLC will then select as the reference the LMU (or LMU sector) with the highest weighted metric. The WCN designated serving sector is automatically selected for LMU signal collection if all the returned RDM are zero.

FIG. 1 depicts a wireless communications network 101 with network-based wireless location facilities 106 107. The wireless communications network (WCN) 101 comprises distributed base transceiver stations (BTS) or access points 103 104 105 106 110 interconnected to a core network 108, which in turn is interconnected via radio or wired means 112 to the public land mobile network (PLMN) and public data network (PDN) 109. In this example WCN 101, all BTS 103 104 105 110 are unsectored, omnidirectional cells for the ease of compression.

The network-based wireless location system (WLS) includes geographically distributed network of receivers 106 also known as Location Measurement Units (LMUs) or Signal Collection Systems (SCS). The location receivers 106 are commonly hosted within or co-located with BTS's 103 104 105 106 to share electrical, environmental, and antenna resources. Some BTS 110 do not have a co-located location receiver. The location receivers 106 are backhauled to the serving mobile location center (SMLC) 107 via wired or wireless data links 110.

When a mobile device 102 (also known as a mobile phone, a cell phone, a mobile station (MS) or user equipment (UE)) is to be located, the Core Network 108 provides the SMLC 107 with radio channel and network information for the mobile device 102 to be located. This network information includes the serving cell 103 identity. The SMLC 107 has databased information on the WCN 101 allowing for the determination of neighboring cells 104 and proximate cells 105 equipped with location receivers 106 that can be used in the signal collection phase of the wireless location.

FIG. 2a depicts a time 201 frequency 202 map for the uplink (mobile to BTS) transmissions from the mobile-to-be-located (also known as the mobile-of-interest or MOI). As in the GSM and LTE wireless communications networks, the mobile transmissions are hopped in a known sequence. The example sequence depicted here has 8 hopped frames over the sample period 204 and received frequency range 203.

As shown in the 4$^{th}$ hopped transmission frame 205, each frame contains a training sequence of known bit sequence or ZC sequence 206. The training sequence is used in GSM to synchronize uplink transmissions and is mandatory in all frames transmitted from the MS. In LTE the Zadoff-Chu sequence is used as pilot signal to perform frequency domain channel estimation and also must occur in every uplink frame. In FIG. 2a, the mobile device has been placed in DTX mode and later frames in the hopping sequence 207 are not transmitted.

FIG. 2b depicts a time 201 frequency 202 map for the uplink (mobile to BTS) transmissions from an interfering mobile to the actual mobile-of-interest. As in the GSM and LTE wireless communications networks, the mobile transmissions are hopped in a known sequence. The example sequence depicted here has 8 hopped frames over the sample period 204 and received frequency range 203. Note that the frequencies in the hopping pattern match the MOI (FIG. 2a) uplink transmissions in only frames f(q), f(q+4), f(q+6), and f(q+7).

As shown in the hopped transmission frames 208, the interfering mobile transmits a frame 208 in the same frequency and during the same (approximate) time as the MOI. The interfering frames 208 also contain the training sequence of known bit sequence (in GSM) or a ZC sequence 208 (in LTE).

FIGS. 3a and 3b are used to show the collision between a mobile-of-interest and an interfering mobile as represented as cross-correlations between the received signal and the hopped training sequence. The training sequence can be directly correlated with received signal or demodulated from the received signal than correlated. FIG. 3a shows the cross-correlation between the received signal from the mobile of interest (MOI) and the training sequence. This time 301, correlation 302 graph shows the same 8 frames as the signal 303 shown in FIG. 2a, but cross-correlated with the re-modulated training sequence. Due to DTX, only frames q, q+1, q+2, and q+3 are transmitted by the MOI. A detection threshold 304 has been established to prevent false positives. The signal 303 exceeds the detection threshold in 4 of the 8 frames but at much higher power, representing a stronger signal then the interfering signal detailed in FIG. 3b. The sequence of detected frames is indicated in a series of offsets representing the number of frames between successive detections. In the case of the MOI, the offsets corresponding to FIG. 3a could be represented by 1, 1, 1. This is indicative of a transmission comprised of bursts of sequential transmitted frames.

FIG. 3b shows the cross-correlation between the received signal from the interfering mobile and the training sequence. This time 301, correlation 302 graph shows the same 8 frames as the signal 305 shown in FIG. 2b, but cross-correlated with the re-modulated training sequence. In this case, the interfering mobile is not in DTX and is transmitting each frame in its assigned sequence, but since the receiver is following the hopping sequence of the MOI (FIG. 2a), only frames that are transmitted on the assigned frequency of the MOI in each frame are detected. A detection threshold 304 has been established to prevent false positives. The correlation with the interfering signal 305 exceeds the detection threshold 304 in 3 of the 8 frames. The interfering signal may be at a higher power level (for those LMUs in proximity) than the MOI, which contributes to the interferer generating a higher unweighted metric, confusing selection of the correct reference. In the case of the interfering mobile, the offsets corresponding to FIG. 3b could be represented by 4, 2, 1. This is indicative of the random collision of the hopping sequences of the two mobiles.

Cellular frequency reuse patterns were originally conceived to minimize co-channel interference between users. Large cellular reuse patterns (e.g. 11 cells, 7 cells) also have the advantage that no coordination of frequency use between base stations was required. As cellular reuse patterns tighten in an effort to increase total system throughput, there is an increased chance of an interfering mobile device when a network-based wireless location is being performed. In FIGS. 4a, 4b, 4c, and 4d, frequencies are represented by letters.

Figure 4B:
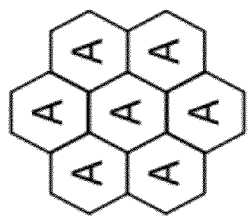
FIG. 4b graphically depicts a 4-cell frequency reuse pattern in a wireless communications system.
Figure 4D:
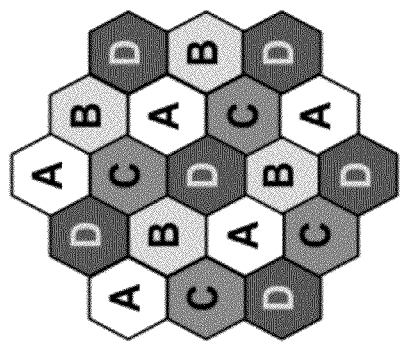
FIG. 4d graphically depicts a 1-cell frequency reuse pattern in a wireless communications system.
Figure 4A:
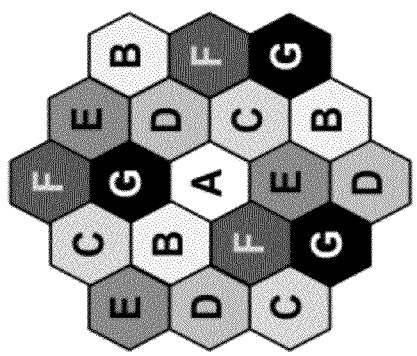
FIG. 4a graphically depicts a 7-cell frequency reuse pattern in a wireless communications system.

FIG. 4a shows the classic 7-cell reuse pattern where adjacent and proximate cells use different frequencies. In effect, an interfering mobile transmission would come from over 2 BTS diameters away.

FIG. 4b shows the 4-cell reuse pattern. In this pattern, interfering mobile transmissions would arrive attenuated by at least a full BTS diameter.

Figure 4C:
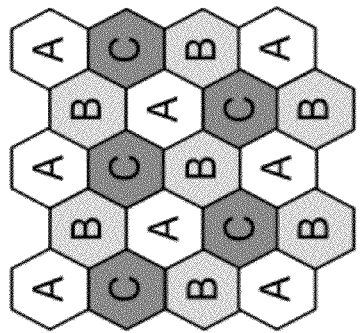
FIG. 4c graphically depicts a 3-cell frequency reuse pattern in a wireless communications system.

FIG. 4c shows the 3-cell reuse pattern. In this pattern, interfering mobile transmissions would arrive attenuated by at least a BTS diameter.

FIG. 4a shows the 1-cell reuse pattern. In this pattern, interfering mobile transmissions are expected and may require inter-BTS coordination to minimize interference and advanced signal processing to mitigate interference.

Figure 5:
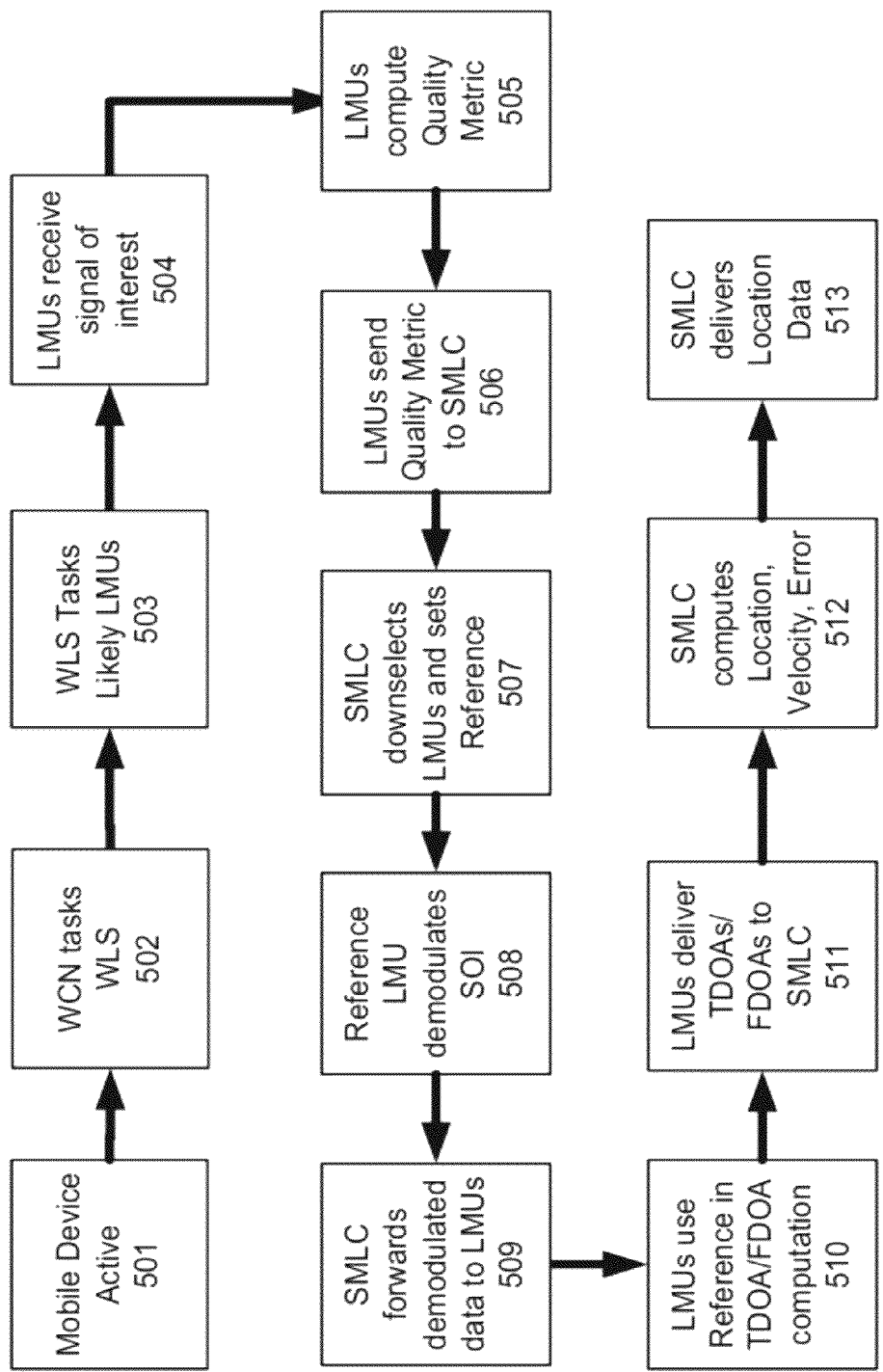
FIG. 5 diagrammatically depicts the two stage signal reception and selection for wireless location.

FIG. 5 shows the entire location process for a network-based wireless location system using uplink time-difference-of-arrival (U-TDOA) for location calculation. First the mobile device is active 501, in radio communication with the wireless network. The uplink transmission may be on a control or traffic/data channel. The BSC/MSC provides a position request with channel assignment and network information to the SMLC 502, tasking the WLS. The SMLC commands the LMUs at surrounding sites, based on the serving cell, to digitize and store RF energy 503. LMUs receive the signal of interest 504 at multiple antenna ports per base station, never less than one per sector, meaning that both primary and secondary sectors can be at the same LMU. Using the known midamble (or pre- or post-amble), cross-correlation with the received signal is used to produce a received quality metric 505. This quality metric is delivered to the SMLC by all commanded LMUs 506.

The LMU with the best detection metric (usually the serving cell site's serving sector) is selected by the SMLC as the reference while LMUs with lesser detection metrics above a threshold are selected as co-operating receivers 507.

The LMU at the reference site then distributes its received waveform data and sends it to the SMLC 508. The demodulated data is distributed to all surrounding LMUs 509. The LMUs cross-correlate the reference waveform with their stored signal data to compute TDOA measurements 510. The LMUs then return the measurements to the SMLC 511.

The SMLC computes the position, velocity, and error estimates 512. The SMLC then reports the location data to the requesting or designated network entity 513.

Conclusion

The true scope the present invention is not limited to the illustrative or presently preferred embodiments described herein. For example, the illustrative details described above in respect to the wireless location system (WLS) deployed within a wireless communications network (WCN), depicted in FIG. 1, may be altered without departing from the scope of protection defined by the claims set forth below. In many cases, the place of implementation (i.e., the functional element) described herein is merely a designer's preference and not a hard requirement. The inventive techniques and concepts described herein apply to various time and frequency division multiplexed (TDMA/FDMA) radio communications systems. These include the widely used IS-136 (TDMA), GSM, and OFDM (WiMAX, LTE, LTE-Advanced) wireless systems, as well as code-division radio communications systems such as CDMA (IS-95, IS-2000) and Universal Mobile Telecommunications System (UTMS), the latter of which is also known as W-CDMA. The Global System for Mobile Communications (GSM) model is an exemplary but not exclusive environment in which the present invention may be used.

What is claimed:

1. A method for use in a wireless location system (WLS) associated with a wireless communications network (WCN), wherein the WCN is configured to serve mobile devices using a cellular arrangement of base stations, a frequency reuse pattern, and frequency hopping patterns, comprising:

at a serving mobile location center (SMLC) associated with the WLS, receiving a position request concerning a mobile-of-interest (MOI), wherein the MOI is operating in a discontinuous transmission (DTX) mode in the WCN;

in response to the position request, tasking the WLS to locate the MOI, wherein said tasking includes communicating commands from the SMLC to a plurality of location measurement units (LMUs) at sites surrounding the MOI, wherein said commands instruct said LMUs to receive and digitize radio frequency (RF) energy, and to store signal data representing said RF energy;

at said plurality of LMUs, receiving a signal of interest (SOI) and cross-correlating a known midamble, preamble or post-amble with the received signal of interest to produce a received detection metric;

weighting the detection metric produced by each of said plurality of LMUs so as to favor the MOI even in the presence of interference from other mobile devices operating in the WCN;

at the SMLC, selecting the LMU with the best weighted detection metric as a reference site and selecting two or more LMUs with lesser weighted detection metrics above a threshold as co-operating sites;

at the reference site, sampling the received SOI and communicating sample data to the SMLC;

at the SMLC, distributing the sample data to the co-operating sites;

at the co-operating sites, producing a reference waveform from the sample data, and cross-correlating the reference waveform with stored signal data to produce a time-difference-of-arrival (TDOA) measurement at each of said co-operating sites;

communicating the TDOA measurements from the co-operating sites to the SMLC; and at the SMLC, computing position, velocity, and error estimates for the MOI.

2. The method as recited in claim 1, wherein the position request includes a channel assignment and network information including identification of a serving cell.

3. The method as recited in claim 2, wherein the position request further includes a training sequence for midamble, pre-amble or post-amble detection, and frequency hopping pattern and timeslot information.

4. The method as recited in claim 1, wherein said weighting is based on a numerical distribution of a frame offset list, wherein frame offset sequences with groups of small offsets interspersed with larger offsets are favored over sequences of more evenly distributed offsets.

5. The method as recited in claim 4, wherein said weighting involves discarding a portion of the frame offsets and averaging the remaining offset values, and then dividing the detection metric produced by each LMU by a weighting factor to produce the weighted detection metric used in selection of the reference site.

6. The method as recited in claim 5, further comprising deriving the weighting factor by dividing a prescribed number by a number representing a number of detected frames.

7. The method as recited in claim 1, wherein the detection metric approach is only applied to cases where the MOI is present in the detection data.

8. The method as recited in claim 1, wherein said plurality of LMUs receive said SOI via multiple antenna ports per site, including at least one antenna port per sector.

9. The method as recited in claim 1, further comprising reporting computed position data to the requesting network entity or a designated network entity.

10. The method as recited in claim 1, wherein the weighting is performed at the SMLC.

11. The method as recited in claim 1, wherein the weighting is performed at each of said LMUs, and further comprising communicating the weighted detection metric from each of said plurality of LMUs to the SMLC.

12. A system, comprising:
a wireless communications network (WCN) configured to serve mobile devices using a cellular arrangement of base stations, a frequency reuse pattern, and frequency hopping patterns;
a wireless location system (WLS) comprising a plurality of location measurement units (LMUs) and a serving mobile location center (SMLC), wherein the WLS is operatively coupled to said WCN;

wherein the system is configured to carry out the following acts:

at the SMLC, receiving a position request concerning a mobile-of-interest (MOI), wherein the MOI is operating in a discontinuous transmission (DTX) mode in the WCN;

in response to the position request, tasking the WLS to locate the MOI, wherein said tasking includes communicating commands from the SMLC to a plurality of LMUs, wherein said commands instruct said LMUs to receive and digitize radio frequency (RF) energy, and to store signal data representing said RF energy;

at said plurality of LMUs, receiving a signal of interest (SOI) and cross-correlating a known training sequence with the received signal of interest to produce a received detection metric, wherein the known training sequence includes at least one of a known midamble, pre-amble or post-amble;

weighting the detection metric produced by each of said plurality of LMUs so as to favor the MOI even in the presence of interference from other mobile devices operating in the WCN;

at the SMLC, selecting the LMU with the best weighted detection metric as a reference site and selecting two or more LMUs with lesser weighted detection metrics above a threshold as co-operating sites;

at the reference site, sampling the received SOI and communicating sample data to the SMLC;

at the SMLC, distributing the sample data to the co-operating sites;

at the co-operating sites, producing a reference waveform from the sample data, and cross-correlating the reference waveform with stored signal data to produce a time-difference-of-arrival (TDOA) measurement at each of said co-operating sites;

communicating the TDOA measurements from the co-operating sites to the SMLC; and at the SMLC, computing position estimates for the MOI.

13. The system as recited in claim 12, wherein the system is further configured to receive at the SMLC a position request including a channel assignment and network information including identification of a serving cell.

14. The system as recited in claim 13, wherein the system is further configured to receive at the SMLC a position request including a training sequence, and frequency hopping pattern and timeslot information.

15. The system as recited in claim 12, wherein the system is further configured to base said weighting on a numerical distribution of a frame offset list, wherein frame offset sequences with groups of small offsets interspersed with larger offsets are favored over sequences of more evenly distributed offsets.

16. The system as recited in claim 15, wherein said weighting involves discarding a portion of the frame offsets and averaging the remaining offset values, and then dividing the detection metric produced by each LMU by a weighting factor to produce the weighted detection metric used in selection of the reference site.

17. The system as recited in claim 12, wherein the system is further configured to derive a weighting factor by dividing a prescribed number by a number representing a number of detected frames.

18. The system as recited in claim 12, wherein the system is further configured to apply the detection metric approach only to cases where the MOI is present in the detection data.

19. The system as recited in claim 12, wherein the system is further configured to receive, at said plurality of LMUs, said SOI via multiple antenna ports per site, including at least one antenna port per sector.

20. The system as recited in claim 12, wherein the system is further configured to report computed position data to a requesting network entity or a designated network entity.

21. The system as recited in claim 12, wherein the system is further configured to perform the weighting at the SMLC.

22. The system as recited in claim 12, wherein the system is further configured to perform the weighting at each of said LMUs, and to communicate the weighted detection metric from each of said plurality of LMUs to the SMLC.

23. A tangible computer readable medium comprising a plurality of computer readable instructions for controlling a system including a wireless communications network (WCN) configured to serve mobile devices using a cellular arrangement of base stations, a frequency reuse pattern, and frequency hopping patterns, and a wireless location system (WLS) including a plurality of location measurement units (LMUs) and a serving mobile location center (SMLC), said instructions comprising instructions for:

- at the SMLC, receiving a position request concerning a mobile-of-interest (MOI), wherein the MOI is operating in a discontinuous transmission (DTX) mode in the WCN;
- in response to the position request, tasking the WLS to locate the MOI, wherein said tasking includes communicating commands from the SMLC to a plurality of LMUs, wherein said commands instruct said LMUs to receive and digitize radio frequency (RF) energy, and to store signal data representing said RF energy;
- at said plurality of LMUs, receiving a signal of interest (SOI) and cross-correlating a known training sequence with the received signal of interest to produce a received detection metric;
- weighting the detection metric produced by each of said plurality of LMUs so as to favor the MOI even in the presence of interference from other mobile devices operating in the WCN;
- at the SMLC, selecting the LMU with the best weighted detection metric as a reference site and selecting two or more LMUs with lesser weighted detection metrics above a threshold as co-operating sites;
- at the reference site, sampling the received SOI and communicating sample data to the SMLC;
- at the SMLC, distributing the sample data to the co-operating sites;
- at the co-operating sites, producing a reference waveform from the sample data, and cross-correlating the reference waveform with stored signal data to produce a time-difference-of-arrival (TDOA) measurement at each of said co-operating sites;
- communicating the TDOA measurements from the co-operating sites to the SMLC; and at the SMLC, computing position estimates for the MOI.

* * * * *